United States Patent
Kwatra et al.

(10) Patent No.: US 11,321,153 B1
(45) Date of Patent: May 3, 2022

(54) CONTEXTUAL COPY AND PASTE ACROSS MULTIPLE DEVICES

(71) Applicant: International Business Machines Corporation, Armonk, NY (US)

(72) Inventors: Shikhar Kwatra, San Jose, CA (US); Raghuveer Prasad Nagar, Kota (IN); Amitava Kundu, Bangalore (IN); Petr Novotny, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/225,161

(22) Filed: Apr. 8, 2021

(51) Int. Cl.
*G06F 9/54* (2006.01)
*G06F 7/26* (2006.01)
*G06F 11/34* (2006.01)

(52) U.S. Cl.
CPC ............. *G06F 9/543* (2013.01); *G06F 7/26* (2013.01); *G06F 9/542* (2013.01); *G06F 11/3438* (2013.01)

(58) Field of Classification Search
CPC ........ G06F 9/543; G06F 40/166; G06F 9/542; G06F 7/26
See application file for complete search history.

(56) References Cited

U.S. PATENT DOCUMENTS

| | | | | |
|---|---|---|---|---|
| 7,496,853 B2 * | 2/2009 | Awada | | G06F 3/04842 715/716 |
| 8,099,428 B2 * | 1/2012 | Kottomtharayil | | G06F 16/134 707/E17.128 |
| 8,832,578 B1 * | 9/2014 | Shah | | G06F 9/543 715/770 |
| 9,325,775 B2 | 4/2016 | Jitkoff | | |
| 10,417,320 B2 * | 9/2019 | Fairweather | | G06F 3/04842 |
| 10,599,772 B2 * | 3/2020 | Hewitt | | G06F 40/16 |
| 2005/0138658 A1 * | 6/2005 | Bryan | | H04H 60/43 725/46 |
| 2010/0235770 A1 | 9/2010 | Ording | | |

(Continued)

FOREIGN PATENT DOCUMENTS

CN 112395109 A * 2/2021
KR 101805934 B1 12/2017

OTHER PUBLICATIONS

CN 112395109A Machine Translation from WIPO (Year: 2021).*

(Continued)

*Primary Examiner* — Alvin H Tan
(74) *Attorney, Agent, or Firm* — William H. Hartwell; Aaron N. Pontikos

(57) ABSTRACT

A tool for providing context-based copy and paste commands. The tool monitors a plurality of user activities across one or more user devices for a plurality of copied content items and associated contextual data. The tool generates a list of the plurality of copied content items and the associated contextual data. Responsive to a determination that a user issued a paste command, the tool calculates a relevancy score for each of the plurality of copied content items in the list. The tool determines at least one of the plurality of copied content items to fulfill the paste command based, at least in part, on the relevancy score for each of the plurality of copied content items. The tool presents the at least one of the plurality of copied content items to a user to select for the paste command.

17 Claims, 3 Drawing Sheets

(56) References Cited

U.S. PATENT DOCUMENTS

| | | | |
|---|---|---|---|
| 2012/0096368 A1 | 4/2012 | McDowell | |
| 2014/0156463 A1* | 6/2014 | Hui .................... | G06Q 30/0621 |
| | | | 705/26.61 |
| 2015/0012861 A1 | 1/2015 | Loginov | |
| 2017/0154188 A1 | 6/2017 | Meier | |
| 2019/0325016 A1* | 10/2019 | Nicholson ............... | G06F 9/543 |

OTHER PUBLICATIONS

"How does copy and paste work?", Quora, Grammarly, downloaded from the internet on Feb. 16, 2021, <https://www.quora.com/How-does-copy-and-paste-work>, 3 pages.

"System and method for smart multiple Copy/Paste using compression logic", An IP.com Prior Art Database Technical Disclosure, Authors et al.: Disclosed Anonymously, IP.com No. IPCOM000262633D, IP.com Electronic Publication Date: Jun. 17, 2020, 3 pages.

"Use Universal Clipboard to copy and paste between your Apple devices", Apple Support, downloaded from the Internet on Feb. 16, 2021, 3 pages, <https://support.apple.com/en-US/HT209460>.

Chapuis et al., "Copy-and-Paste Between Overlapping Windows", CHI 2007 Proceedings • Navigation & Interaction, Apr. 28-May 3, 2007 • San Jose, CA, USA, 10 pages.

Guay, Matthew, "How to Copy and Paste Multiple Items at Once", The Zapier Guide to Clipboard Managers, Mar. 1, 2018, 3 pages, <https://zapier.com/blog/best-clipboard-managers/>.

Iritani et al., "Copy and paste across Windows 10 devices using cloud clipboard", Microsoft, Jan. 15, 2019, 15 pages, <https://community.windows.com/en-us/stoies/cloud-clipboard-windows-10>.

Jablonski et al., "CReN: A Tool for Tracking Copy-and-Paste Code Clones and Renaming Identifiers Consistently in the IDE", EIX'07, Oct. 21-22, 2007, Montreal, Quebec, Canada, 5 pages.

Kerr et al., "Context-Sensitive Cut, Copy, and Paste", C3S2E-08 May 12-13, 2008, Montreal [QC, Canada], pp. 159-166.

Miller et al., "Synchronizing Clipboards of Multiple Computers", In Proceedings of the 12th annual ACM symposium on User interface software and technology, UIST '99. Asheville, NC, pp. 65-66.

Nield, David, "Copy and paste seamlessly across all your devices", Popular Science, Jan. 28, 2020, 15 pages, <https://www.popsci.com/story/diy/copy-paste-across-devices/>.

Pahwa et al., "Cross Platform E2E encrypted clipboard sharing utility", Nov. 15, 2020, Retrieved from https://github.com/iayanpahwa/anywheredoor, 6 pages.

Whitney, Lance, "How to Copy and Paste Multiple Items in One Shot", Mar. 13, 2017, PC Mag, 6 pages, <https://in.pcmag.com/operating-systems-and-platforms-and-price/113218/how-to-copy-and-paste-multiple-items-in-one-shot>.

Whitney, Lance, "How to Use the New and Improved Windows 10 Clipboard", PCMag, Oct. 15, 2018, 12 pages, <https://www.pcmag.com/how-to/how-to-use-the-new-and-improved-windows-10-clipboard>.

* cited by examiner

CONTEXTUAL COPY AND PASTE ACROSS MULTIPLE DEVICES

BACKGROUND OF THE INVENTION

The present invention relates generally to computing device functionality, and more particularly to context-based copy and paste commands across multiple user devices.

In human-computer interaction and user interface design, cut, copy, and paste commands offer an inter-process communication technique for transferring data through a user interface of a computing device. A cut command removes selected data from its original position, and a copy command creates a duplicate of selected data without removing the selected data from its original position. Cut commands and copy commands temporarily store selected data in temporary storage (e.g., a clipboard). A paste command inserts data that is stored in temporary storage into a selected location. These commands provide the capability to replicate and reconfigure data with ease and are utilized in both professional and personal activities performed on a computing device.

SUMMARY

Aspects of an embodiment of the present invention disclose a method, computer program product, and computer system for providing context-based copy and paste commands across multiple user devices. The method includes monitoring, by one or more computer processors, a plurality of user activities across one or more user devices for a plurality of copied content items and associated contextual data. The method further includes generating, by the one or more computer processors, a list of the plurality of copied content items and the associated contextual data. Responsive to a determination that a user issued a paste command, the method further includes calculating, by the one or more computer processors, a relevancy score for each of the plurality of copied content items in the list, wherein the relevancy score is calculated based, at least in part, on a source application from which each of the plurality of copied content items were copied and a type of activity being performed on the source application when each of the plurality of copied content items were copied. The method further includes determining, by the one or more processors, at least one of the plurality of copied content items to fulfill the paste command based, at least in part, on the relevancy score for each of the plurality of copied content items. The method further includes presenting, by the one or more computer processors, the at least one of the plurality of copied content items to a user to select for the paste command.

DETAILED DESCRIPTION

Embodiments of the present invention recognize that during editing, a user may be required to perform numerous copy and paste activities. Embodiments of the present invention recognize that a limitation of traditional copy and paste commands is that a paste command always selects the latest content item that has been copied in a buffer, which results in a user either retyping or reissuing the copy command again to achieve a desired content item based on the current context. Embodiments of the present recognize that traditional copy and paste commands could benefit from considering contextual data during copy and paste activities.

Embodiments of the present invention provide the capability to provide copy, cut and paste command functionality that considers contextual data during copy and paste activities. For example, embodiments of the present invention provide the capability for an email paste command to suggest relevant copied content items and to apply them in an appropriate context. Embodiments of the present invention provide the capability to track recently active application windows across one or more user devices, along with ongoing user activities, to paste contextually relevant copied content items among recently stored copied content items. Embodiments of the present invention provide the capability to monitor user editing activities over time to learn copy and paste patterns of a user based on various contextual situations. Embodiments of the present invention provide the capability to utilize copy and paste commands using any supported input mode. Embodiments of the present invention provide the capability to improve a machine learning system utilizing a reinforcement learning model based on user feedback of copied content items and pasted content.

Implementation of such embodiments may take a variety of forms, and exemplary implementation details are discussed subsequently with reference to the Figures.

Figure 1:
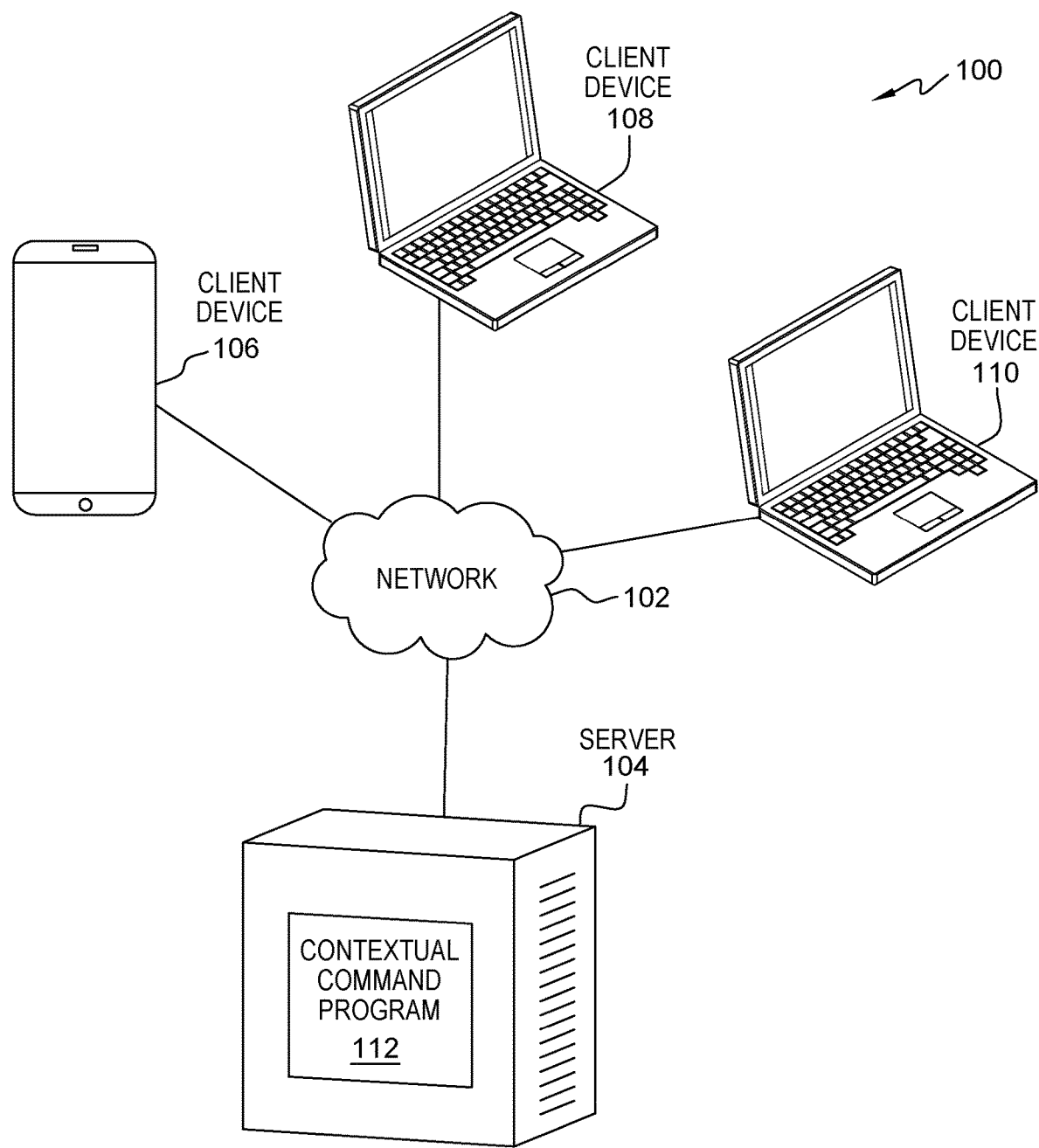
FIG. 1 illustrates a data processing environment, generally designated 100, in accordance with an embodiment of the present invention.

Referring now to various embodiments of the invention in more detail, FIG. 1 is a functional block diagram that illustrates a data processing environment, generally designated 100, suitable for providing context-based copy and paste commands across multiple user devices, in accordance with at least one embodiment of the invention. The present invention will now be described in detail with reference to the Figures. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. FIG. 1 includes network 102, server 104, which includes contextual command program 112, and one or more client devices, such as client device 106, client device 108, and client device 110.

In one embodiment, network 102 is the Internet representing a worldwide collection of networks and gateways that use TCP/IP protocols to communicate with one another. Network 102 may include wire cables, wireless communication links, fiber optic cables, routers, switches and/or firewalls. Server 104, client device 106, client device 108, and client device 110 are interconnected by network 102. Network 102 can be any combination of connections and protocols capable of supporting communications between server 104, client device 106, client device 108, client device 110, and contextual command program 112. Network 102 can be, for example, a telecommunications network, a local area network (LAN), a virtual local area network (VLAN), a wide area network (WAN), such as the Internet, or a combination of the three, and can include wired, wireless, or fiber optic connections. Network 102 may include one or more wired and/or wireless networks that are capable of receiving and transmitting data, voice, and/or video signals, including multimedia signals that include voice, data, and video information. In general, network 102 may be any combination of connections and protocols that will support communications between server 104, client device 106, client device 108, client device 110, and contextual command program 112, as well as other computing devices (not shown) within data processing environment 100. FIG. 1 is intended as an example and not as an architectural limitation for the different embodiments.

In one embodiment, server 104 may be, for example, a server computer system such as a management server, a web server, or any other electronic device or computing system capable of sending and receiving data. In another embodiment, server 104 may be a data center, consisting of a collection of networks and servers, such as virtual servers and applications deployed on virtual servers, to an external party. In another embodiment, server 104 represents a "cloud" of computers interconnected by one or more networks, where server 104 is a computing system utilizing clustered computers and components to act as a single pool of seamless resources when accessed through network 102. This is a common implementation for data centers in addition to cloud computing applications. In one embodiment, server 104 includes contextual command program 112 for providing context-based copy and paste commands across multiple user devices, such as illustrated by client device 106, client device 108, and client device 110, respectively.

In one embodiment, contextual command program 112 operates on a central server, such as server 104, and can be utilized by one or more client devices, such as client device 106, client device 108, and client device 110, via an application download from the central server or a third-party application store and executed on the one or more client devices. In another embodiment, contextual command program 112 may be software, downloaded from a central server, such as server 104, and installed on one or more client devices, such as client device 106, client device 108, and client device 110. In yet another embodiment, contextual command program 112 may be utilized as a software service provided by a third-party cloud service provider (not shown). In yet another embodiment, contextual command program 112 may include one or more components (not shown), such as add-ons, plug-ins, and agent programs, etc., installed on one or more client devices, such as client device 106, client device 108, and client device 110, to provide context-based copy and paste commands across multiple user devices. In one embodiment, contextual command program 112 can be an add-on feature to a computer program (e.g., word processor program, communication program, web browser, social media applications, coding software, etc.) that provides a user the ability to utilize context-based copy and paste commands across multiple user devices. In one embodiment, contextual command program 112 can be fully integrated, partially integrated, or separate from a third-party service (e.g., collaboration service, communication service, etc.). In one embodiment, contextual command program 112 may be an application, downloaded from an application store or third-party provider, capable of being used in conjunction with a computer program during interactions between one or more authorized users utilizing a plurality of user devices, such as client device 106, client device 108, and client device 110, to provide context-based copy and paste commands across the plurality of user devices.

In one embodiment, contextual command program 112 can be utilized by one or more user devices, such as client device 106, client device 108, and client device 110, to provide context-based copy and paste commands across the one or more user devices. In one embodiment, contextual command program 112 provides the capability to provide copy, cut and paste command functionality that considers contextual data during copy, cut and paste activities. In one embodiment, contextual command program 112 provides the capability to monitor copy, cut and paste activities across one or more user devices for copied content items and associated contextual data. In one embodiment, contextual command program 112 provides the capability to generate a list of the copied content items and associated contextual data and assign a relevancy score to each of the copied content items within the list based, at least in part, on a type of application source from which the copied content items originated, and a type of activity being performed when each of the content items were copied. In one embodiment, contextual command program 112 provides the capability to determine at least one copied content item from the generated list to present to the user to fulfill a paste command on the one or more user devices.

In one embodiment, contextual command program 112 may be configured to access various data sources, such as a database or repository (not shown), that may include personal data, content, contextual data, or information that a user does not want to be processed. Personal data includes personally identifying information or sensitive personal information as well as user information, such as location tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. Contextual command program 112 enables the authorized and secure processing of personal data. In one embodiment, contextual command program 112 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. In one embodiment, contextual command program 112 provides information regarding personal data and the nature (e.g., type, scope, purpose, duration, etc.) of the processing. In one embodiment, contextual command program 112 provides a user with copies of stored personal data. In one embodiment, contextual command program 112 allows the correction or completion of incorrect or incomplete personal data. In one embodiment, contextual command program 112 allows the immediate deletion of personal data.

In one embodiment, client device 106, client device 108, and client device 110 are clients to server 104 and may be, for example, a desktop computer, a laptop computer, a tablet computer, a personal digital assistant (PDA), a smart phone, a thin client, or any other electronic device or computing system capable of communicating with server 104 through network 102. For example, client device 106 may be a mobile device, such as a smart phone, capable of connecting to a network, such as network 102, to access the Internet, utilize an enabled two-factor authentication security system, and utilize one or more software applications. In another example, client device 108 and client device 110 may be a user device authorized for access by one or more additional users. In one embodiment, client device 106, client device 108, and client device 110 may be any suitable type of client device capable of executing one or more applications utilizing a mobile operating system or a computer operating system. In one embodiment, client device 106, client device 108, and client device 110 may include a user interface (not shown) for providing a user with the capability to interact with contextual command program 112, and one or more authorized users via a user device, such as client device 108 and client device 110. A user interface refers to the information (such as graphic, text, and sound) a program presents to a user and the control sequences the user employs to control the program. There are many types of user interfaces. In one embodiment, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements.

In one embodiment, client device 106, client device 108, and client device 110 may be any wearable electronic devices, including wearable electronic devices affixed to eyeglasses and sunglasses, helmets, wristwatches, clothing, wigs, tattoos, embedded devices, and the like, capable of sending, receiving, and processing data. In one embodiment, client device 106, client device 108, and client device 110 may be any wearable computer capable of supporting context-based copy and paste commands across multiple user devices. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In general, client device 106, client device 108, and client device 110 each represent one or more programmable electronic devices or combination of programmable electronic devices capable of executing machine readable program instructions and communicating with other computing devices (not shown) within data processing environment 100 via a network, such as network 102.

Figure 2:
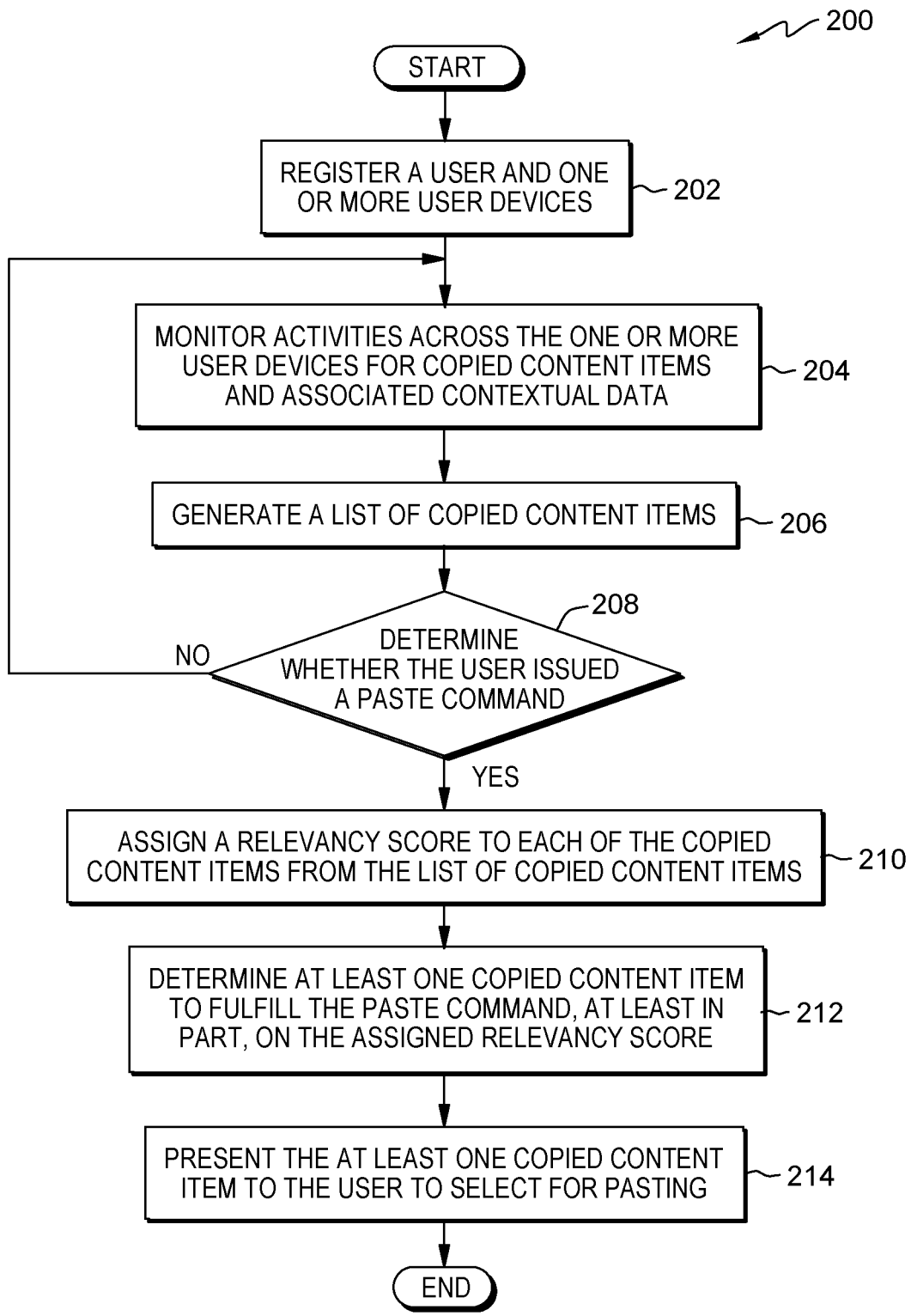
FIG. 2 is a flowchart depicting operational steps of a contextual command program, such as the contextual command program of FIG. 1, generally designated 200, for providing context-based copy and paste commands across multiple user devices, in accordance with an embodiment of the present invention.

FIG. 2 is a flowchart depicting operational steps of a contextual command program, such as contextual command program 112, generally designated 200, for providing context-based copy and paste commands across multiple user devices, in accordance with an embodiment of the present invention. Although FIG. 2 depicts operational steps of a contextual command program for providing context-based copy and paste commands, embodiments of the present invention may be similarly practiced for providing context-based cut and paste commands across multiple user devices.

Contextual command program 112 registers a user and one or more user devices (202). In one embodiment, contextual command program 112 registers a user and one or more user devices by prompting the user to enter user information and device information for at least one of the one or more user devices to be stored in an associated user profile. In one embodiment, user information may include a username, unique user identification (i.e., user ID), user password, and a plurality of user preferences, etc. In one embodiment, device information may include a unique device identification number, one or more users authorized to use the one or more user devices, and a plurality of device characteristics, etc. In one embodiment, contextual command program 112 may register a group of users in addition to the user (e.g., family members, friends, and social media contacts, etc.) based, at least in part, on an explicit or implicit list of users. In one embodiment, an implicit list of additional users can be derived from social media data, such as contacts, friends, associations, and groups, etc. linked to the user. In another embodiment, an implicit list of additional users can be derived from internet-of-things (IoT) data, such as which devices and additional users are in a physical proximity to the user or authorized location. In one embodiment, contextual command program 112 may register one or more user devices for the user or the group of additional users based, at least in part, on an explicit or implicit list of user devices. In one embodiment, where user devices are not registered explicitly, user information for the user, or the group of additional users, at a login is leveraged to identify which user copied a content item. In one embodiment, contextual command program 112 utilizes registration of the user, the one or more user devices, and the group of additional users to monitor and track activities, such as copying content items from various sources during various user activities (e.g., text editor, messaging application, social media, word processor, etc.).

Contextual command program 112 monitors activities across the one or more user devices for copied content items and associated contextual data (204). In one embodiment, contextual command program 112 monitors user activities across the one or more user devices for copied content items and associated contextual data based, at least in part, on a plurality of management criterion preferences, where user activities include, but are not limited to, editing activities, browsing activities, social media activities, and any other activity where copy and paste commands may be issued. In one embodiment, contextual command program 112 may monitor activity across the one or more devices for copied content items and associated contextual data based on a numeric threshold that can be user defined or machine learned. For example, a numeric threshold for monitoring activities across the one or more user devices for copied content items and associated contextual data may be based on a pre-defined time period (monitor and store copied content items and associated contextual data for the last two days), or a fixed number of content items (monitor and store copied content items and associated contextual data for the last twenty copied content items). In another embodiment, contextual command program 112 may monitor activity across the one or more devices for copied content items and associated contextual data based on a characterization of attributes. For example, a characterization of attributes for monitoring activities across the one or more user devices for copied content items and associated contextual data may be based on a type or category of a source application where content items originated from or are copied from (e.g., text editor, messaging application, social media, word processor, etc.), or a type of content (e.g., text, a table, an image, etc.). In yet another embodiment, contextual command program 112 may monitor activity across the one or more devices for copied content items and associated contextual data based on data privileges and access controls. For example, data privileges for monitoring activities across the one or more user devices for copied content items and associated contextual data may be based on natural language processing (NLP), such as bagging techniques, where NLP is leveraged to determine whether copied content items indicate privileged or non-privileged data. In another example, access controls for monitoring activities across the one or more user devices for copied content items and associated contextual data may be based on user preferences that define a type of data that indicates privileged data and non-privileged data, and additionally can control who can access and paste the type of data. In one embodiment, contextual command program 112 determines associated contextual data when content items are copied. For example, contextual command program 112 monitors activities across the one or more user devices for copied content items, and for each of a plurality of copied content items, contextual command program 112 captures contextual data that is present when each content item was copied, where the contextual data includes, but not limited to, data related to a source from which the content item was copied (e.g., a word processor, a web browser, a social media application, etc.), a time at which the content item was copied (e.g., during a workday or while on a vacation), and an action (e.g., editing an image, document, or presentation, posting to social media, reading a news article, etc.) being performed when the content item was copied, etc.

Contextual command program 112 generates a list of copied content items (206). In one embodiment, contextual command program 112 generates a list of copied content items that have been stored in a buffer based, at least in part, on one or more of a type of copied content item, a source application from which the content item was copied, a type of activity being performed on a source application when the content item was copied, and associated contextual data related to each of the copied content items.

Contextual command program 112 determines whether the user issued a paste command (decision block 208). In one embodiment, contextual command program 112 determines whether the user issued a paste command by detecting a typing input (e.g., text generation) from at least one of the one or more user devices. In one embodiment, contextual command program 112 may detect the typing input from a keyboard integrated with at least one of the one or more user devices, such as a keyboard of client device 106. For example, contextual command program 112 may detect the typing input, such as "command-V" or "Ctrl-V", from a keystroke combination made on a wireless keyboard paired to the at least one of the one or more user devices. In another embodiment, contextual command program 112 may detect the typing input entered into a user interface integrated with at least one of the one or more user devices. For example, contextual command program 112 may detect the typing input when the user selects a paste command, such as "paste", within a dedicated drop-down field within a user interface of an application on at least one of the one or more user devices. In yet another embodiment, contextual command program 112 may detect the typing input from a touchscreen integrated with at least one of the one or more user devices. For example, contextual command program 112 may detect typing input from a tactile touch stroke or pressure activated input on a touchscreen displayed indicating a paste command on at least one of the one or more user devices. In yet another embodiment, contextual command program 112 may detect a typing input from any combination of a plurality of sources originating from or connected to the one or more user devices. In one embodiment, where contextual command program 112 detects a typing input indicating a paste command on at least one of the one or more user devices, contextual command program 112 determines that the user has issued a paste command. In one embodiment, where contextual command program 112 does not detect a typing input indicating a paste command on at least one of the one or more user devices, contextual command program 112 determines that the user has not issued a paste command.

Responsive to a determination that the user has not issued a paste command (decision block 208, NO branch), contextual command program 112 continues to monitor activities across the one or more user devices for copied content items and associated contextual data (204) and continues to generate the list of copied content items (206).

Responsive to a determination that the user has issued a paste command (decision block 206, YES branch), contextual command program 112 assigns a relevancy score to each of the copied content items from the list of copied content items (210). In one embodiment, contextual command program 112 assigns a relevancy score to each of the copied content items from the list of copied content items by calculating the relevancy score for each of the copied content items from the generated list of copied content items, wherein the relevancy score is calculated based, at least in part, on one or more of a type of copied content item, a source application from which the content item was copied, a type of activity being performed on a source application when the content item was copied, and contextual data related to each of the copied content items. In one embodiment, contextual command program 112 calculates a relevancy score for each of the one or more copied content items based on a plurality of attributes of the copied content items compared to one or more attributes of a current content item, action, or context by leveraging word embedding and cosine similarity techniques known in the art. In one embodiment, contextual command program 112 calculates a relevancy score in a specific numeric range (e.g., 1 to 10) based on how relevant (e.g., based on cosine similarity, machine learning, semantic analysis, and natural language processing, etc.) each of the one or more copied content items are to a target type of copied content item, a target source application from which a copied content item will be pasted, a target type of activity being performed on the target source application when the paste command was issued, and contextual data related to each of the copied content items. In one embodiment, contextual command program 112 calculates a relevancy score based on prior user feedback (e.g., the user, or the group of users) and machine learning that indicates whether a copied content item was relevant in fulfillment of a previously issued paste command. In one embodiment, contextual command program 112 adjusts the relevancy score for each of the copied content items utilizing a reward function, where the reward function may be a positive factor value of "+x" for user feedback indicating a user confidence above a pre-defined threshold, or a negative factor of "−x" for user feedback indicating irrelevancy of the copied content item. In some embodiments, contextual command program 112 adjusts the relevancy score for one or more of the copied content items based on environmental variables, where the environmental variables include, but are not limited to, state parameters of the one or more user devices.

Contextual command program 112 determines at least one copied content item to fulfill the paste command based, at least in part, on the assigned relevancy score (212). In one embodiment, contextual command program 112 determines at least one copied content item to fulfill the paste command by comparing the relevancy scores for each of the copied content items and selecting at least the copied content item having the highest relevancy score within a given range, such as a copied content item having a relevancy score of "10" within the given range of "1 to 10". In one embodiment, where two or more copied content items share the highest relevancy scores within the given range, contextual command program 112 selects the two or more copied content items to present to the user or group of users with an option to select a preferred copied content item from the two or more copied content items.

Contextual command program 112 presents the at least one copied content item to the user to select for pasting (214). In one embodiment, where contextual command program 112 selected the copied content item having the highest relevancy score to fulfill the paste command, contextual program 112 presents the copied content item to the user or group of users via a user interface on the one or more user devices. In another embodiment, where contextual command program 112 selected the copied content item having the highest relevancy score to fulfill the paste command, contextual program 112 may automatically paste the copied content item seamlessly into a location selected by the user or the group of users when issuing the paste command. In one embodiment, where contextual command program 112 selected two or more copied content items to fulfill the paste command, contextual program 112 presents the two or more copied content items to the user or group of users via a user interface on the one or more user devices, along with an option (e.g., a prompt) to select a preferred copied content item from the two or more copied content items. In one embodiment, in response to presenting the user or group of users with a copied content item to fulfill the paste command, contextual command program 112 prompts the user or the group of users to elicit feedback to be incorporated into a reinforcement active feedback model to further train machine learning related to calculating relevancy scores for the copied content items.

Figure 3:
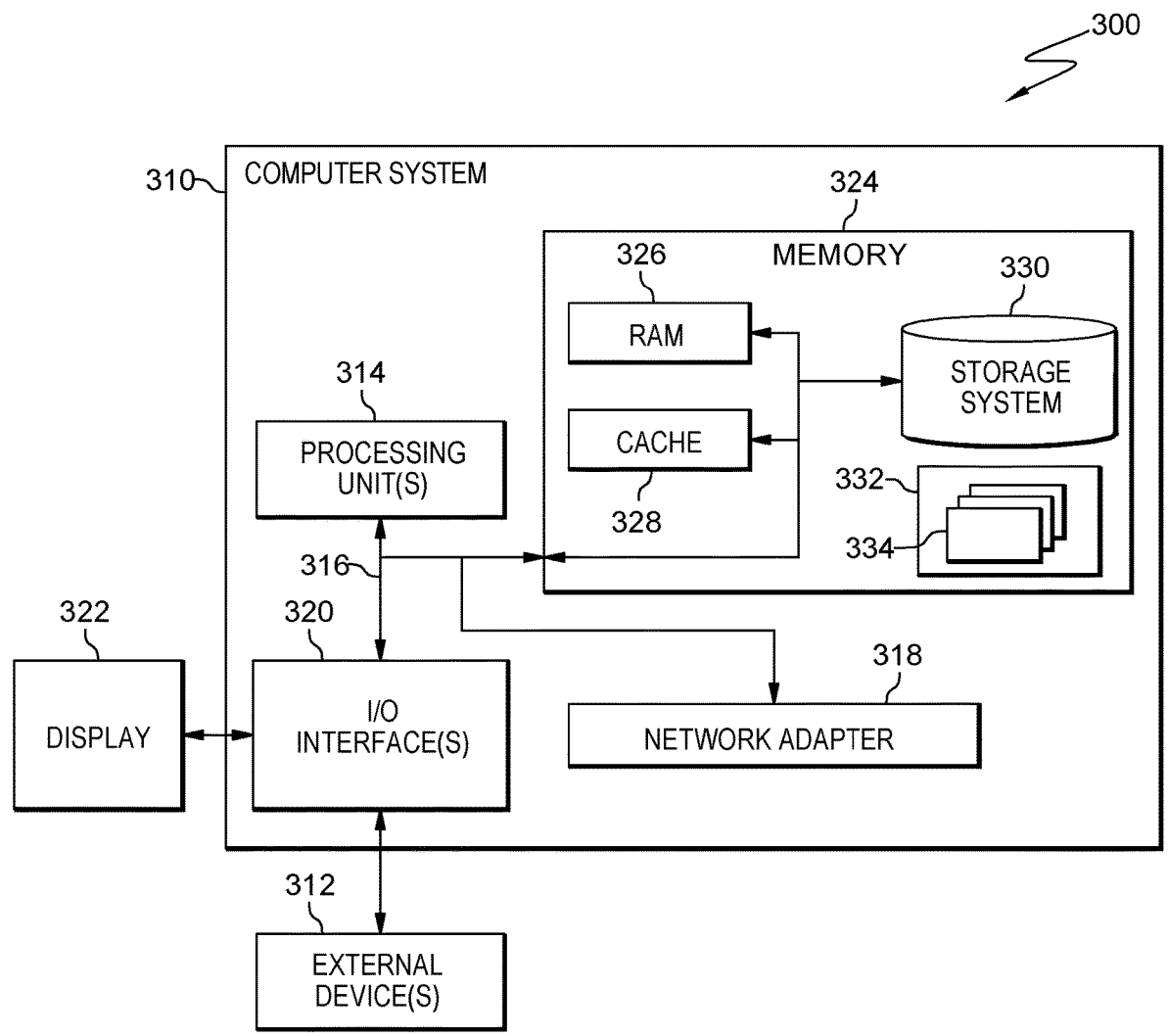
FIG. 3 is a block diagram depicting components of a data processing environment, such as the server of FIG. 1, generally designated 300, in accordance with an embodiment of the present invention.

FIG. 3 is a block diagram depicting components of a data processing environment, such as server 104 of data processing environment 100, generally designated 300, in accordance with an embodiment of the present invention. It should be appreciated that FIG. 3 provides only an illustration of one implementation and does not imply any limitations with regard to the environments in that different embodiments may be implemented. Many modifications to the depicted environment may be made.

In the illustrative embodiment, server 104 in data processing environment 100 is shown in the form of a general-purpose computing device, such as computer system 310. The components of computer system 310 may include, but are not limited to, one or more processors or processing unit(s) 314, memory 324 and bus 316 that couples various system components including memory 324 to processing unit(s) 314.

Bus 316 represents one or more of any of several types of bus structures, including a memory bus or memory controller, a peripheral bus, an accelerated graphics port and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus and Peripheral Component Interconnect (PCI) bus.

Computer system 310 typically includes a variety of computer system readable media. Such media may be any available media that is accessible by computer system 310 and it includes both volatile and non-volatile media, removable and non-removable media.

Memory 324 can include computer system readable media in the form of volatile memory, such as random access memory (RAM) 326 and/or cache memory 328. Computer system 310 may further include other removable/non-removable, volatile/non-volatile computer system storage media. By way of example only, storage system 330 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk") and an optical disk drive for reading from or writing to a removable, non-volatile optical disk, such as a CD-ROM, DVD-ROM or other optical media can be provided. In such instances, each can be connected to bus 316 by one or more data media interfaces. As will be further depicted and described below, memory 324 may include at least one computer program product having a set (e.g., at least one) of program modules that are configured to carry out the functions of embodiments of the invention.

Program/utility 332, having one or more sets of program modules 334, may be stored in memory 324 by way of example and not limitation, as well as an operating system, one or more application programs, other program modules and program data. Each of the operating systems, one or more application programs, other program modules and program data or some combination thereof, may include an implementation of a networking environment. Program modules 334 generally carry out the functions and/or methodologies of embodiments of the invention as described herein. Computer system 310 may also communicate with one or more external device(s) 312, such as a keyboard, a pointing device, a display 322, etc. or one or more devices that enable a user to interact with computer system 310 and any devices (e.g., network card, modem, etc.) that enable computer system 310 to communicate with one or more other computing devices. Such communication can occur via Input/Output (I/O) interface(s) 320. Still yet, computer system 310 can communicate with one or more networks, such as a local area network (LAN), a general wide area network (WAN) and/or a public network (e.g., the Internet) via network adapter 318. As depicted, network adapter 318 communicates with the other components of computer system 310 via bus 316. It should be understood that although not shown, other hardware and software components, such as microcode, device drivers, redundant processing units, external disk drive arrays, RAID systems, tape drives and data archival storage systems may be used in conjunction with computer system 310.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable) or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It will be understood that each block of the flowchart illustrations and/or block diagrams and combinations of blocks in the flowchart illustrations and/or block diagrams, can be implemented by computer readable program instructions.

These computer readable program instructions may be provided to a processor of a general purpose computer, a special purpose computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus or other device to cause a series of operational steps to be performed on the computer, other programmable apparatus or other device to produce a computer implemented process, such that the instructions which execute on the computer, other programmable apparatus or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

What is claimed is:

1. A method for providing context-based copy and paste commands, the method comprising:
monitoring, by one or more computer processors, a plurality of user activities across one or more user devices for a plurality of copied content items and associated contextual data wherein the monitoring is of a fixed number of content items during a pre-defined time period, and wherein the monitoring is based, at least in part, on one or more user preferences that: (i) define a type of data that indicates privileged data and non-privileged data, and (ii) control which of the one or more user devices that can access and paste the type of data;

generating, by the one or more computer processors, a list of the plurality of copied content items and the associated contextual data;

responsive to a determination that a user issued a paste command, calculating, by the one or more computer processors, a relevancy score for each of the plurality of copied content items in the list, wherein the relevancy score is calculated based, at least in part, on a source application from which each of the plurality of copied content items were copied and a type of activity being performed on the source application when each of the plurality of copied content items were copied;

determining, by the one or more processors, at least one of the plurality of copied content items to fulfill the paste command based, at least in part, on the relevancy score for each of the plurality of copied content items; and presenting, by the one or more computer processors, the at least one of the plurality of copied content items to the user to select for the paste command.

2. The method of claim 1, further comprising:
registering, by the one or more computer processors, the user, the one or more user devices, and a group of additional users, wherein registering the group of additional users includes determining an implicit list of additional users based, at least in part, on social media data.

3. The method of claim 1, further comprising:
monitoring, by the one or more computer processors, the plurality of user activities based on a characterization of attributes for the plurality of copied content items, wherein the characterization of attributes is based on a type of the source application where each of the plurality of copied content items originated.

4. The method of claim 1, wherein calculating the relevancy score, further comprises:
calculating, by the one or more computer processors, the relevancy score in a specific numeric range based, at least in part, on how relevant each of the plurality of copied content items are to a target type of copied content item, a target source application from which a copied content item will be pasted, a target type of activity being performed on the target source application when the paste command is issued, and contextual data related to each of the plurality of copied content items; and
adjusting, by the one or more computer processors, the relevancy score for each of the plurality of copied content items based on a reward function, wherein the reward function is a positive factor value based on user feedback indicating a user confidence in a copied content item above a pre-defined threshold.

5. The method of claim 1, further comprising:
assigning, by the one or more computer processors, the relevancy score to each of the plurality of copied content items in the list of the plurality of copied content items.

6. The method of claim 1, wherein determining at least one of the plurality of copied content items to fulfill the paste command, further comprises:
comparing, by the one or more computer processors, the relevancy score for each of the plurality of copied content items in the list of the plurality of copied content items and selecting the copied content item having a highest relevancy score within a specific numeric range.

7. A computer program product for providing context-based copy and paste commands, the computer program product comprising:
one or more computer readable storage media and program instructions stored on the one or more computer readable storage media, the stored program instructions comprising:
program instructions to monitor a plurality of user activities across one or more user devices for a plurality of copied content items and associated contextual data wherein the monitoring is of a fixed number of content items during a pre-defined time period, and wherein the monitoring is based, at least in part, on one or more user preferences that: (i) define a type of data that indicates privileged data and non-privileged data, and (ii) control which of the one or more user devices that can access and paste the type of data;
program instructions to generate a list of the plurality of copied content items and the associated contextual data;
program instructions to, responsive to a determination that a user issued a paste command, calculate a relevancy score for each of the plurality of copied content items in the list, wherein the relevancy score is calculated based, at least in part, on a source application from which each of the plurality of copied content items were copied and a type of activity being performed on the source application when each of the plurality of copied content items were copied;
program instructions to determine at least one of the plurality of copied content items to fulfill the paste command based, at least in part, on the relevancy score for each of the plurality of copied content items; and
program instructions to present the at least one of the plurality of copied content items to the user to select for the paste command.

8. The computer program product of claim 7, the stored program instructions further comprising:
program instructions to register the user, the one or more user devices, and a group of additional users, wherein registering the group of additional users includes determining an implicit list of additional users based, at least in part, on social media data.

9. The computer program product of claim 7, the stored program instructions further comprising:
program instructions to monitor the plurality of user activities based on a characterization of attributes for the plurality of copied content items, wherein the characterization of attributes is based on a type of the source application where each of the plurality of copied content items originated.

10. The computer program product of claim 7, wherein the program instructions to calculate the relevancy score, further comprise:

program instructions to calculate the relevancy score in a specific numeric range based, at least in part, on how relevant each of the plurality of copied content items are to a target type of copied content item, a target source application from which a copied content item will be pasted, a target type of activity being performed on the target source application when the paste command is issued, and contextual data related to each of the plurality of copied content items; and program instructions to adjust the relevancy score for each of the plurality of copied content items based on a reward function, wherein the reward function is a positive factor value based on user feedback indicating a user confidence in a copied content item above a pre-defined threshold.

11. The computer program product of claim 7, the stored program instructions further comprising:

program instructions to assign the relevancy score to each of the plurality of copied content items in the list of the plurality of copied content items.

12. The computer program product of claim 7, wherein the program instructions to determine at least one of the plurality of copied content items to fulfill the paste command, further comprise:

program instructions to compare the relevancy score for each of the plurality of copied content items in the list of the plurality of copied content items and selecting the copied content item having a highest relevancy score within a specific numeric range.

13. A computer system for providing context-based copy and paste commands, the computer system comprising:

one or more computer processors;

one or more computer readable storage media; and program instructions stored on at least one of the one or more computer readable storage media for execution by at least one of the one or more computer processors, the stored program instructions comprising:

program instructions to monitor a plurality of user activities across one or more user devices for a plurality of copied content items and associated contextual data wherein the monitoring is of a fixed number of content items during a pre-defined time period, and wherein the monitoring is based, at least in part, on one or more user preferences that: (i) define a type of data that indicates privileged data and non-privileged data, and (ii) control which of the one or more user devices that can access and paste the type of data;

program instructions to generate a list of the plurality of copied content items and the associated contextual data;

program instructions to, responsive to a determination that a user issued a paste command, calculate a relevancy score for each of the plurality of copied content items in the list, wherein the relevancy score is calculated based, at least in part, on a source application from which each of the plurality of copied content items were copied and a type of activity being performed on the source application when each of the plurality of copied content items were copied;

program instructions to determine at least one of the plurality of copied content items to fulfill the paste command based, at least in part, on the relevancy score for each of the plurality of copied content items; and program instructions to present the at least one of the plurality of copied content items to the user to select for the paste command.

14. The computer system of claim 13, the stored program instructions further comprising:

program instructions to register the user, the one or more user devices, and a group of additional users, wherein registering the group of additional users includes determining an implicit list of additional users based, at least in part, on social media data.

15. The computer system of claim 13, the stored program instructions further comprising:

program instructions to monitor the plurality of user activities based on a characterization of attributes for the plurality of copied content items, wherein the characterization of attributes is based on a type of the source application where each of the plurality of copied content items originated.

16. The computer system of claim 13, wherein the program instructions to calculate the relevancy score, further comprise:

program instructions to calculate the relevancy score in a specific numeric range based, at least in part, on how relevant each of the plurality of copied content items are to a target type of copied content item, a target source application from which a copied content item will be pasted, a target type of activity being performed on the target source application when the paste command is issued, and contextual data related to each of the plurality of copied content items; and program instructions to adjust the relevancy score for each of the plurality of copied content items based on a reward function, wherein the reward function is a positive factor value based on user feedback indicating a user confidence in a copied content item above a pre-defined threshold.

17. The computer system of claim 13, the stored program instructions further comprising:

program instructions to assign the relevancy score to each of the plurality of copied content items in the list of the plurality of copied content items.

* * * * *